US008624887B2

(12) United States Patent
Chang et al.

(10) Patent No.: US 8,624,887 B2

(45) Date of Patent: Jan. 7, 2014

(54) CONTROL CIRCUIT AND METHOD OF FLAT PANEL DISPLAY

(75) Inventors: Meng-Sheng Chang, Hsin-Chu (TW); Hsiao-Chung Cheng, Hsin-Chu (TW)

(73) Assignee: AU Optronics Corp., Hsinchu (TW)

( * ) Notice: Subject to any disclaimer, the term of this patent is extended or adjusted under 35 U.S.C. 154(b) by 178 days.

(21) Appl. No.: 13/218,542

(22) Filed: Aug. 26, 2011

(65) Prior Publication Data

US 2012/0169697 A1 Jul. 5, 2012

(30) Foreign Application Priority Data

Dec. 29, 2010 (TW) ............................... 99146670 A

(51) Int. Cl.
*G06F 3/038* (2013.01)
*G09G 3/36* (2006.01)

(52) U.S. Cl.
USPC .............................. 345/211; 345/95; 345/204

(58) Field of Classification Search
USPC .............................. 345/87–94, 211–215, 690
See application file for complete search history.

(56) References Cited

U.S. PATENT DOCUMENTS 6,538,389 B2 3/2003 Onozawa et al.
6,549,186 B1 * 4/2003 Kwon ............................ 345/95
6,573,881 B1 6/2003 Kwon
7,605,790 B2 10/2009 Hsu
2002/0101174 A1 8/2002 Onozawa et al.
2005/0122321 A1 * 6/2005 Akai et al. .................... 345/204
2006/0290638 A1 12/2006 Kang et al.
2010/0149172 A1 * 6/2010 Tokumasu .................... 345/214

FOREIGN PATENT DOCUMENTS

TW 525129 3/2003
TW 535129 6/2003

OTHER PUBLICATIONS

Taiwan Patent Office, Office Action issued on May 22, 2013.

* cited by examiner

*Primary Examiner* — Alexander Eisen
*Assistant Examiner* — Amit Chatly
(74) *Attorney, Agent, or Firm* — WPAT, PC; Justin King

(57) ABSTRACT

A control circuit and a method for charge sharing are provided. The control circuit and method are applied to a flat panel display including a plurality of pixel units. The control circuit includes a power supply unit, a data driver, a first switch set, a second switch set, a second switch set, and a timing controller. The control method includes steps of: outputting a first control signal to optionally switch on the switches in the first switch set in a first duration to re-allocate charges stored in the plurality of pixel units; and outputting a second control signal to optionally switch on the switches in the second switch set in a second duration to discharge charges stored in the plurality of pixel units via the voltage output pin.

19 Claims, 5 Drawing Sheets

CONTROL CIRCUIT AND METHOD OF FLAT PANEL DISPLAY

TECHNICAL FIELD

The disclosure relates to a control circuit of a flat panel display, and more particularly to a control circuit of a flat panel display exhibiting a charge sharing function. The disclosure also relates to a control method of a flat panel display.

BACKGROUND

Nowadays, flat panel displays such as LCDs are widely applied to consumer electronic products such as mobile phones, laptop computers, desktop presenting means, television sets, etc. With the features of high resolution, compact size, and portability, etc., the applications of flat panel displays are diverse. Consequently, flat panel displays have been replacing conventional CRT displays and become a mainstream of display devices. For portable devices, power consumption is always an issue. Therefore, it is preferred to minimize power consumption of flat panel displays or make use of energy.

SUMMARY

Therefore, an object of the present invention is to provide a charge sharing function for a flat panel display.

According to an embodiment of the present invention, a control circuit for use in a flat panel display flat panel display is provided. The flat panel display comprises a plurality of pixel units, and the control circuit comprising: a power supply unit including a voltage output pin; a data driver including a plurality of data lines electrically connected to the plurality of pixel units, respectively; a first switch set including a plurality of switches, each of which is electrically connected to two of the plurality of data lines; a second switch set including a plurality of switches, which are electrically connected to the voltage output pin in parallel, and electrically connected to first selected ones of the plurality of data lines, respectively; and a timing controller in communication with the power supply unit, the first switch set and the second switch set, outputting a first control signal to optionally switch on the switches in the first switch set in a first duration to re-allocate charges stored in the plurality of pixel units, and outputting a second control signal to optionally switch on the switches in the second switch set in a second duration to discharge charges stored in the plurality of pixel units via the voltage output pin.

Another embodiment according to the present invention, a control method of a control circuit for controlling a flat panel display is provided. The flat panel display comprises a plurality of pixel units, the control circuit comprising a power supply unit, a data driver including a plurality of data lines electrically connected to the pixel units, respectively; a first switch set including a plurality of switches electrically connected to two of the data lines; and a second switch set including a plurality of switches, which electrically connected to a voltage output pin of the voltage supply unit in parallel, and electrically connected to first selected ones of data lines respectively. The control method comprises steps of: outputting a first control signal to optionally switch on the switches in the first switch set in a first duration to re-allocate charges stored in the plurality of pixel units; and outputting a second control signal to optionally switch on the switches in the second switch set in a second duration to discharge charges stored in the plurality of pixel units via the voltage output pin.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

Figure 1:
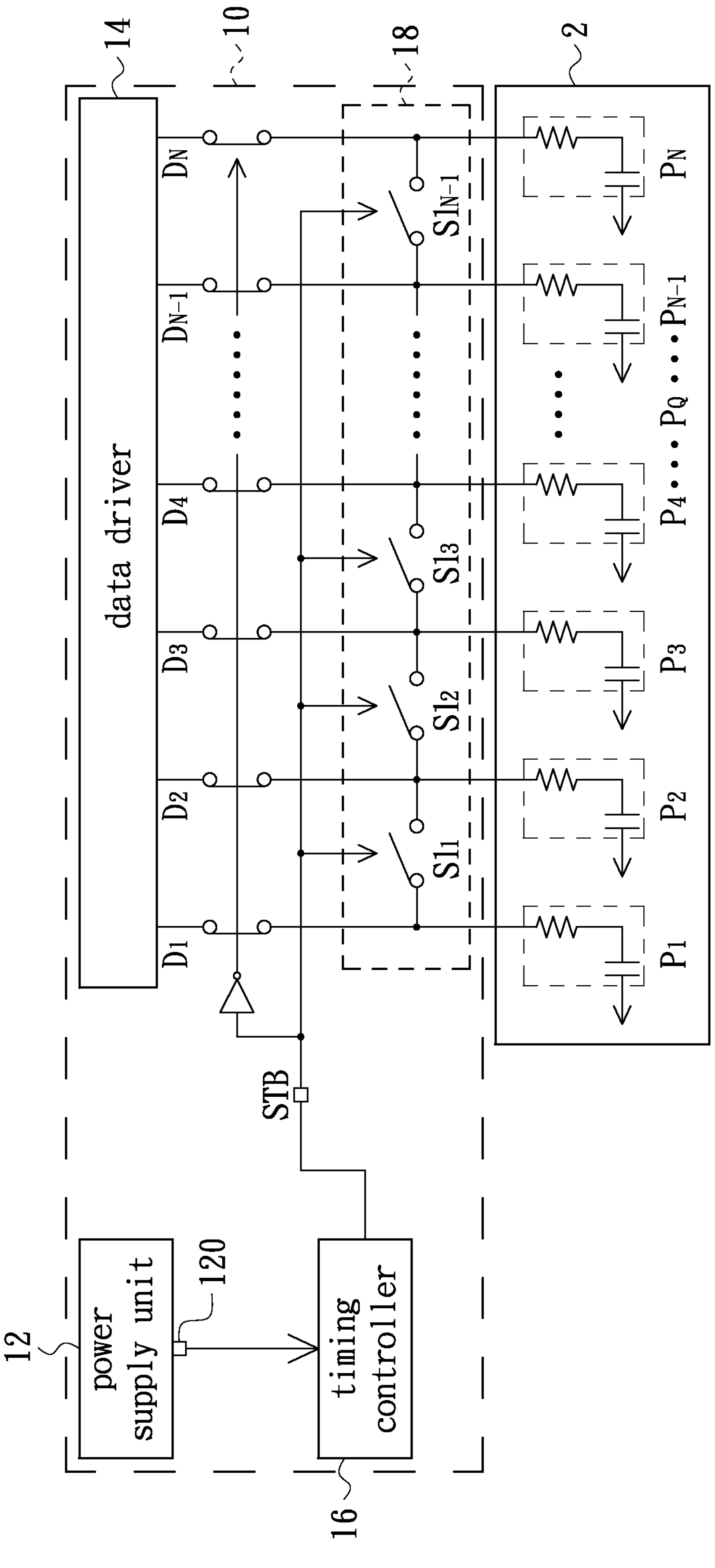
FIG. 1 is a schematic diagram illustrating internal connections of a control circuit exhibiting a charge sharing function according to an embodiment of the present invention.

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

First of all, a charge sharing function is described with reference to FIG. 1, which schematically illustrates a control circuit according to an embodiment of the present invention. The control circuit 10 is used in a flat panel display and includes a power supply unit 12, a data driver 14, and a timing controller 16. The power supply unit 12 is a low dropout regulator (hereinafter, LDO) with a voltage output pin 120 being electrically connected to the timing controller 16. According to the specification of LDO, the voltage output pin 120 is defined with Pin No. 25, for providing a logic signal V_25 to the timing controller 16. The voltage level of the logic level V_25 is V25 (about 2.5 volts).

The control circuit 10 controls the driving and switching of M×N pixel units of the display 2. It is to be noted that only N pixel units ($P_1, P_2, \ldots P_{N-1}, P_N$) disposed in one row are shown in FIG. 1, where N is a positive integer, and similar descriptions are applicable to other rows of pixel units. In each of the pixel units ($P_1, P_2, \ldots P_{N-1}, P_N$), a capacitor is included for storing charges.

In more detail, the data driver 14 is electrically connected to the N pixel units ($P_1, P_2, \ldots P_{N-1}, P_N$) via the N data lines ($D_1, D_2, \ldots D_{N-1}, D_N$), respectively. With the N data lines, the data driver 14 is capable of driving the N pixel units ($P_1, P_2, \ldots P_{N-1}, P_N$) to accumulate or release charges stored in the corresponding capacitors, resulting in displaying or changing of images.

According to the numbers assigned, the N data lines ($D_1, D_2, \ldots D_{N-1}, D_N$) can be classified as two sets, that is, a set of odd-numbered data lines ($D_1, D_3, \ldots DN\text{-}_1$), and another set of even-numbered data lines ($D_2, D_4, \ldots D_N$).

In the control circuit 10, the odd-numbered data lines ($D_1$, $D_3$, . . . $D_{N-1}$) are with an identical polarity in a duration while the even-numbered data lines ($D_2$, $D_4$, . . . $D_N$) are with the opposite polarity in the same duration. For example, the polarities of the odd-numbered data lines ($D_1$, $D_3$, . . . $D_{N-1}$) are positive, and the polarities of the even-numbered data lines ($D_2$、$D_4$、. . . 、$D_N$) are negative in a certain duration. The polarities of the two sets of data lines are exchanged in the next duration. Charge sharing functions are performed during the polarity swapping of the N data lines ($D_1$, $D_2$, . . . $D_{N-1}$, $D_N$) or the pixel units ($P_1$, $P_2$, . . . $P_{N-1}$).

Furthermore, a first switch set 18 is included in the control circuit, and includes (N−1) switches ($S1_1$, $S1_2$, . . . $S1_{N-1}$), wherein two terminals of each switch are electrically connected to adjacent two of the N data lines ($D_1$, $D_2$, . . . $D_{N-1}$, $D_N$), respectively. For instance, the two terminals of the switch $S1_1$ are electrically connected to the data line D1 and data line D2, respectively.

Each of the switches ($S1_1$, $S1_2$, . . . , $S1_{N-1}$) is further coupled to a first control signal STB generated and outputted from the timing controller 16 for switching on the switches ($S1_1$, $S1_2$, . . . , $S1_{N-1}$).

When the N data lines ($D_1$, $D_2$, . . . $D_{N-1}$, $D_N$) or the N pixel units ($P_1$, $P_2$, . . . $P_{N-1}$, $P_N$) change their polarities, the voltage levels of the N data lines are also changed (or the charges stored in the N capacitors of the N pixel units ($P_1$, $P_2$, . . . $P_{N-1}$, $P_N$) are re-allocated). In other words, some of the N capacitors of the N pixel units ($P_1$, $P_2$, . . . $P_{N-1}$, $P_N$) are charged and some are discharged. As a result, the charges stored in the capacitors of the N pixel units can be shared. Therefore, the power consumption during polarity swapping driven by the data driver 14 can be reduced.

Figure 2:
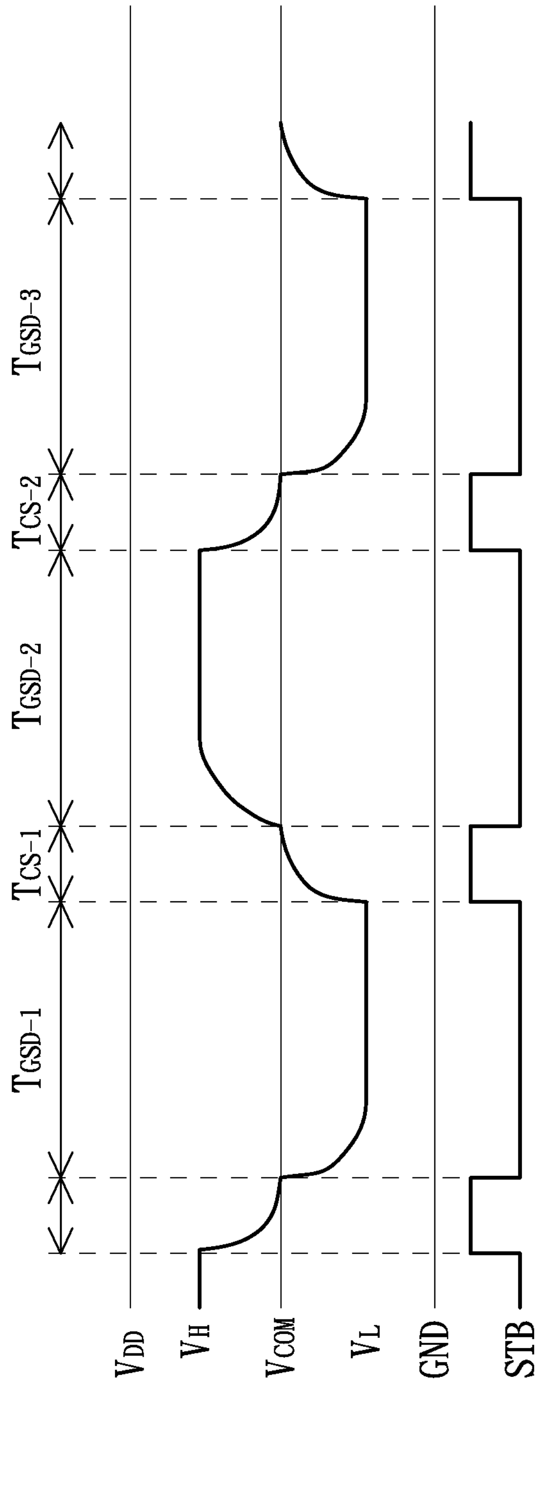
FIG. 2 is a signal waveform diagram illustrating the voltage changes of a capacitor in a pixel unit of the flat panel display as illustrated in FIG. 1.

Further referring to FIG. 2, which schematically illustrates the voltage changes of a capacitor in a pixel unit $P_Q$ of the flat panel display as shown in FIG. 1, the polarity of the pixel unit $P_Q$ is negative in the duration $T_{GSD-1}$ and the voltage level representing the charges accumulated at capacitor of the pixel unit $P_Q$ is $V_L$. Afterwards, the polarity changes into positive one and the voltage level representing the charges accumulated at the capacitor of the pixel unit $P_Q$ is $V_H$ for duration $T_{GSD-2}$. If no charge sharing function is exhibited, the data driver 14 is required to charge the capacitor of the pixel unit $P_Q$ from negative ($V_L$) to positive ($V_H$) for accumulating charges so as to change the polarity of the pixel unit $P_Q$. The power consumption caused by charging the capacitor of the pixel unit $P_Q$ is positively relative to ($V_H$-$V_L$).

With charge sharing function, the timing controller 16 generates and outputs the first control signal STB at a high level for duration $T_{CS-1}$ to switch on the (N−1) switches ($S1_1$, $S1_2$, . . . $S1_{N-1}$) so that the charges stored in the N capacitors of the N pixel units are re-allocated. Accordingly, the voltage levels associated with the N pixel units are balanced and, for example, all reach an intermediate voltage level $V_{COM}$. As a result, the power consumed by the polarity swapping of the pixel unit $P_Q$ (i.e. from negative ($V_L$) to positive ($V_H$)) is positively relative to ($V_H$-$V_{COM}$). It is apparent that the power consumption is reduced.

Likewise, the polarity of the pixel unit $P_Q$ is positive in duration $T_{GSD-2}$ and negative in duration $T_{GSD-3}$. When the polarity of the pixel unit $P_Q$ changes from "positive" to "negative", the timing controller 16 generates and outputs the first control signal STB at high level again for duration $T_{CS-2}$ for switching on the (N−1) switches ($S1_1$, $S1_2$, . . . $S1_{N-1}$). Accordingly, the charges stored in the capacitors of the N pixel units ($P_1$, $P_2$, . . . $P_{N-1}$, $P_N$) are re-allocated to result in a balanced voltage level $V_{COM}$. Thus for changing the polarity of the pixel unit $P_Q$ from "positive" ($V_H$) to "negative" ($V_L$), it is only required to discharge the capacitor of the pixel unit $P_Q$ as a voltage change from $V_{COM}$ to $V_L$. Desirably, the discharged energy is also made use of.

Figure 3:
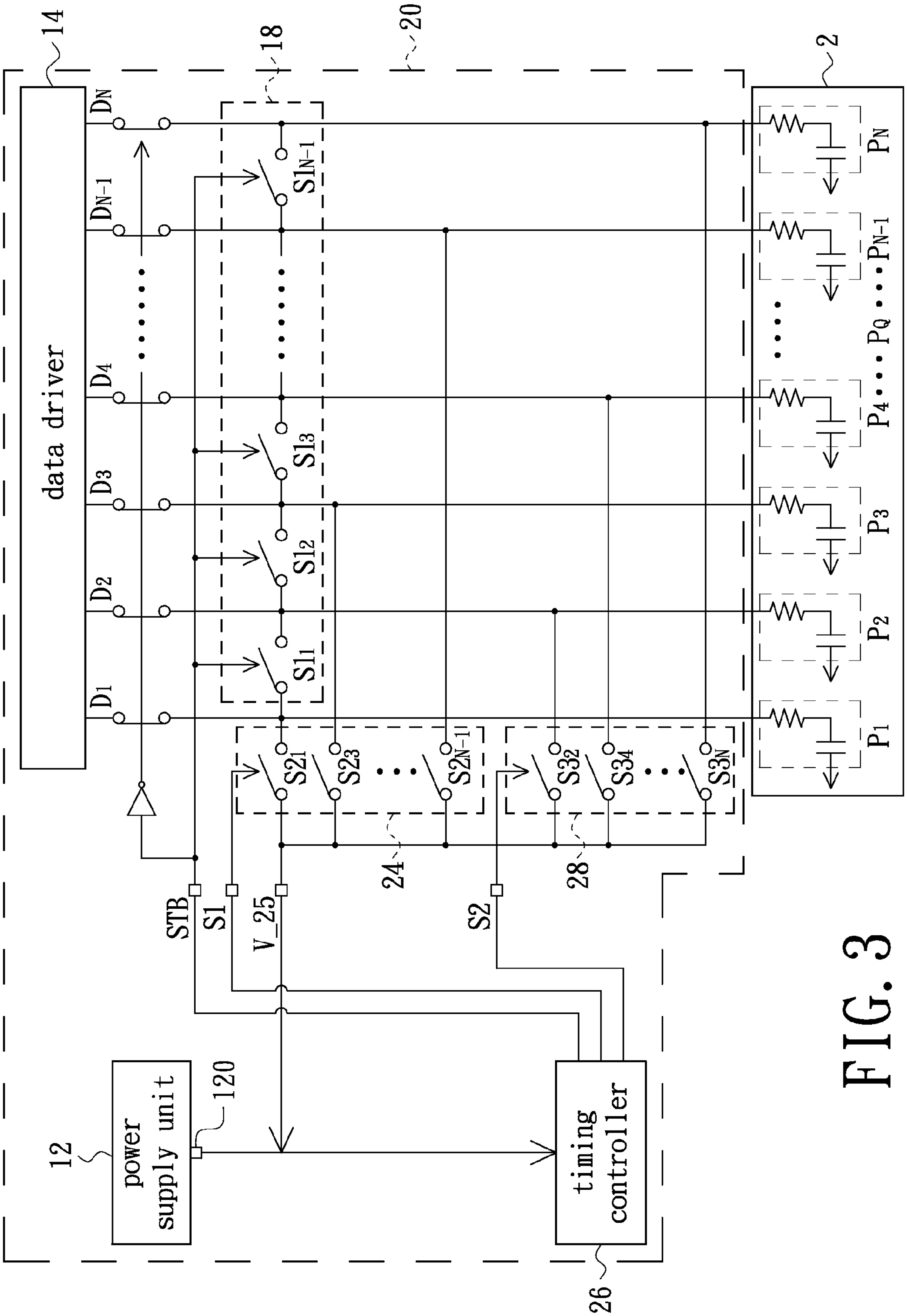
FIG. 3 is a schematic diagram illustrating the internal connections of a control circuit exhibiting a charge sharing function according to another embodiment of the present invention.

FIG. 3 is a schematic diagram illustrating the internal connections of a control circuit exhibiting a charge sharing function according to another embodiment of the present invention. The control circuit 20 is used in the flat panel display 2. The control circuit 20 contains a power supply unit 12, a data driver 14, and a timing controller 26. As discussed, the power supply unit 12 is an LDO with the voltage output pin 120 being electrically connected to the timing controller 26. According to the specification of LDO, the voltage output pin 120 is defined with Pin No. 25 for providing the logic signal V_25. The voltage level of the logic signal V_25 is V25 (about 2.5 volts).

In addition to a first switch set 18 similar to that described above, the control circuit 20 further includes a second switch set 24 consisting of odd-numbered switches ($S2_1$, $S_{23}$, . . . $S2_{N-1}$). First terminals of the switches ($S2_1$, $S2_3$, . . . $S2_{N-1}$) are electrically connected to the voltage output pin 120, and second terminals of the odd-numbered switches are electrically connected to the odd-numbered data lines ($D_1$, $D_3$, . . . $D_{N-1}$). For instance, the second terminal of the switch $S2_1$ is electrically connected to the data line $D_1$.

In this embodiment, the timing controller 26 is electrically connected to both the first switch set 18 and the second switch set 24. The timing controller 26 generates and outputs the first control signal STB to the first switch set 18 for switching on/off the switches ($S1_1$、$S1_2$、. . . 、$S1_{N-1}$) in the first switch set 18. The timing controller 26 further generates and outputs a second control signal S1 to the second switch set 24 for switching on/off the switches ($S2_1$, $S2_3$, . . . $S2_{N-1}$) in the second switch set 24.

Figure 4:
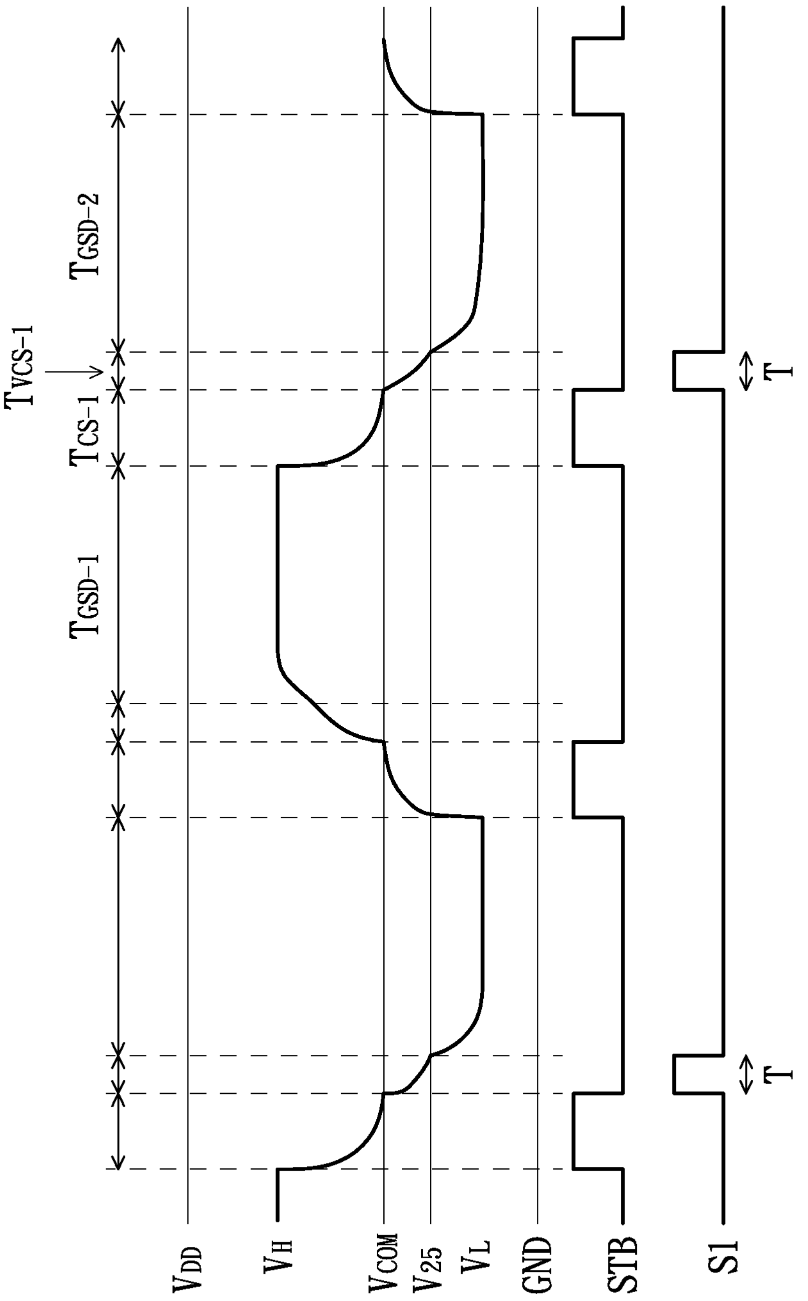
FIG. 4 is a signal waveform diagram illustrating the voltage changes of a capacitor in one of the odd-numbered pixel units of the flat panel display as illustrated in FIG. 3.

FIG. 4 is a signal waveform diagram illustrating the voltage changes of a capacitor in one of the odd-numbered pixel units of the flat panel display as shown in FIG. 3.

The polarity of the pixel unit $P_Q$ is positive ($V_H$) in duration $T_{GSD-1}$. In duration $T_{CS-1}$, the first switch control signal STB generated and outputted by the timing controller 26 is at a high level so as to conduct the switches ($S1_1$, $S1_2$, . . . $S1_{N-1}$). Accordingly, the charges stored in the N capacitors in N pixel units ($P_1$, $P_2$, . . . $P_{N-1}$, $P_N$) are shared. As a result, the voltage level of the charges stored in the capacitor in the pixel unit $P_Q$ is a balanced voltage level $V_{COM}$.

Subsequently, in response to a high level of the second control signal S1 generated and outputted by the timing controller 26, the switches ($S2_1$, $S2_3$, . . . $S2_{N-1}$) are switched on in duration $T_{VCS-1}$. The odd-numbered pixel units ($P_1$, $P_3$, . . . $P_{N-1}$) and the voltage output pin 120 share charges so that the charges stored in the capacitors of the odd-numbered pixel units ($P_1$, $P_3$, . . . $P_{N-1}$) are re-allocated. As described above with reference to FIG. 3, the power supply unit 12 outputs the logic signal V_25, which is at a voltage level V25 (about 2.5 volts), to the timing controller 26. While the polarities of the odd-numbered pixel units ($P_1$, $P_3$, . . . $P_{n-1}$) are changing from positive ones to negative ones in duration $T_{VCS-1}$, the capacitors in the odd-numbered pixel units ($P_1$, $P_3$, . . . $P_{n-1}$) discharge via the voltage output pin 120 of the power supply unit 12 so as to reach the voltage level V25. Meanwhile, receiving the recycled charges from the capacitors, power consumption for outputting logic signal V_25 from the power supply unit 12 can be reduced.

Afterwards, the charges stored in the capacitor in pixel unit $P_Q$ are further discharged in duration $T_{GSD-2}$ until the voltage level drops from V25 to $V_L$ so as to complete the conversion of polarity from positive one to negative one.

The voltage level of the plurality of capacitors in the odd-numbered pixel units ($P_1$, $P_3$, . . . $P_{N-1}$), after charge sharing, is desirably a sufficiently high level so that the charges from the odd-numbered pixel units ($P_1$, $P_3$, . . . $P_{N-1}$) can be effectively recycled to the voltage output pin 120. On the other hand, if the voltage level representing the averaged gray level of the odd-numbered pixel units ($P_1$, $P_3$, . . . $P_{N-1}$) is lower than the voltage level V25, the charge flow from the odd-numbered pixel units ($P_1$, $P_3$, . . . $P_{N-1}$) to the voltage output pin 120 cannot be performed, and thus no power saving can be accomplished.

Therefore, it is preferred that an averaged gray level of the odd-numbered pixel units ($P_1$, $P_3$, . . . $P_{N-1}$) is calculated and compared with a threshold. If the averaged gray level is lower than the threshold, it is indicated that voltage level indicative of the averaged gray level is higher than the desired value. Then the high level of the second control signal S1 is entered to enable the charge recycling.

Figure 5:
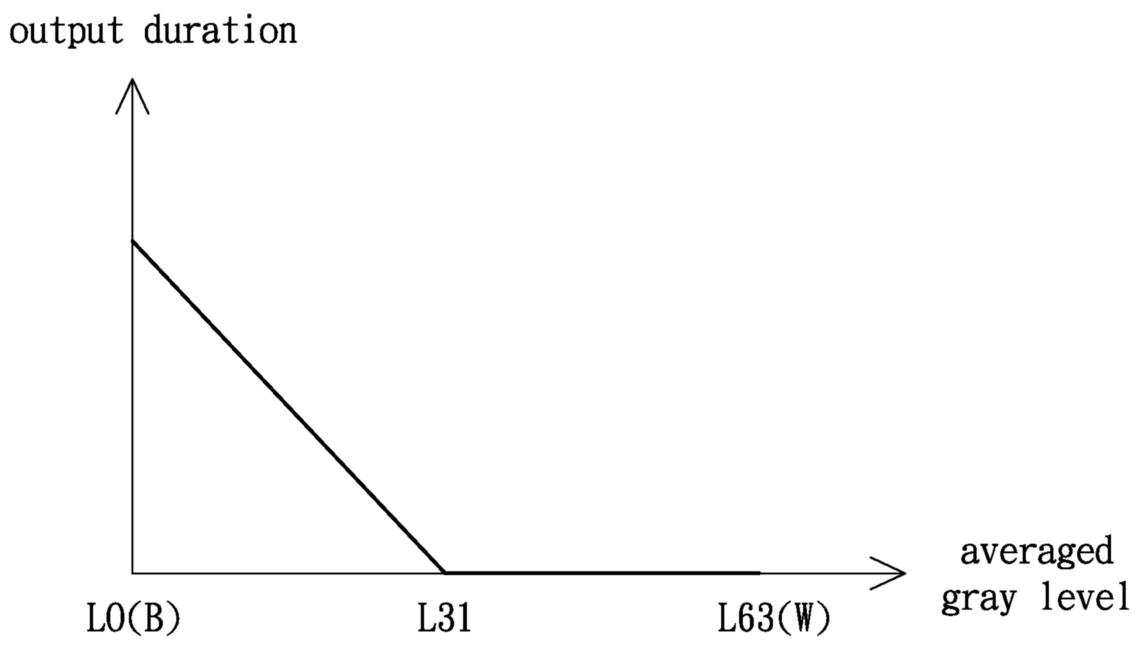
FIG. 5 is a plot schematically illustrating the change of an output duration of a control signal with an averaged gray level of the odd-numbered pixel units.

FIG. 5 is a plot schematically illustrating the change of an output duration of a control signal with an averaged gray level of the odd-numbered pixel units, wherein the reference L31 is exemplified as the threshold as described above.

It can be seen from the figure that the averaged gray level higher than the threshold L31 is directed to a relatively low voltage level of the odd-numbered pixel units ($P_1$, $P_3$, . . . $P_{N-1}$) insufficient for recycling. As a result, the timing controller 26 does not output the second control signal S1 at the high level. In other words, the second control signal S1 will not enter the high level, and the output duration T of the high-level second control signal S1 is zero.

On the other hand, if the timing controller 26 determines that the averaged gray level of the odd-numbered pixel units ($P_1$, $P_3$, . . . $P_{N-1}$) is less than the threshold L31, it is inferred that the averaged voltage level of the charges stored in the capacitors of the odd-numbered pixel units ($P_1$, $P_3$, . . . $P_{N-1}$) is relatively high (e.g. greater than 2.5 volts). Hence charges are recycled from the odd-numbered pixel units ($P_1$, $P_3$, . . . $P_{N-1}$) to the voltage output pin 120, and the timing controller 26 outputs the second control signal S1 at the high level for an output duration T which varies with the averaged gray level For instance, referring to FIG. 5, for the averaged gray levels less than threshold L31, the lower the averaged gray level, the more charges are accumulated in the capacitors in the odd-numbered pixel units ($P_1$, $P_3$, . . . $P_{N-1}$). Therefore, it takes longer for the pixel units to discharge via the voltage output pin 120 in response to a longer output duration T of the high-level second control signal S1. Specifically, the duration that the second control signal S1 is at the high level, i.e. the output duration T, is inversely proportional to the averaged gray level of the odd-numbered pixel units ($P_1$, $P_3$, . . . $P_{N-1}$).

According to the present invention, the control circuit 20 may further includes a third switch set 28 including even-numbered switches ($S3_2$, $S3_4$, . . . $S3_N$), as shown in FIG. 3. First terminals of the switches ($S3_2$, $S3_4$, . . . $S3_N$) in the third switch set are electrically connected to the voltage output pin 120 in parallel, and second terminals of the switches are electrically connected to the even-numbered data lines ($D_2$, $D_4$, . . . $D_N$), respectively.

Likewise, the charges stored in the capacitors in these pixel units ($P_2$, $P_4$, . . . $P_N$) are recycled via the voltage output pin 120 to the power supply unit 12. The operations of the third switch set 28 are similar to those of the second switch set 24. For instance, the second terminal of switch $S3_2$ is electrically connected to the data line $D_2$. Moreover, the third switching signal S2 generated and outputted from the timing controller 26 is used to switch on/off the even-numbered switches ($S3_2$, $S3_4$, . . . $S3_N$).

In summary, the control circuit provided by the present invention is managed to reduce power consumption of the flat panel display. The charges stored in the capacitors in the pixel units can be shared and recycled via the specific voltage output pin of the power supply unit while the polarities of the N pixel units is swapping.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A control circuit for use in a flat panel display, the flat panel display comprising a plurality of pixel units, and the control circuit comprising:

a power supply unit including a voltage output pin;

a data driver coupled to a plurality of data lines which are electrically connected to the plurality of pixel units, respectively;

a first switch set including a plurality of switches, each of which is electrically connected to two of the plurality of data lines;

a second switch set including a plurality of switches, which are electrically connected to the voltage output pin in parallel, and electrically connected to first selected ones of the plurality of data lines, respectively; and a timing controller in communication with the power supply unit, the first switch set and the second switch set, for outputting a first control signal to optionally switch on the switches in the first switch set in a first duration to re-allocate charges stored in the plurality of pixel units, and outputting a second control signal to optionally switch on the switches in the second switch set in a second duration to discharge charges stored in the plurality of pixel units via the voltage output pin;

wherein the timing controller switches off the switches in the second switch set if an averaged gray level of an image is higher than a threshold.

2. The control circuit according to claim 1, wherein the data driver is electrically connected to capacitors of the plurality of pixel units via the plurality of data lines, respectively.

3. The control circuit according to claim 1, wherein the power supply unit is a low dropout regulator.

4. The control circuit according to claim 1, wherein when the number of the plurality of data lines is N, the number of the plurality of switches in the first switch set is N−1, and each of the plurality of switches in the first switch set is electrically connected to adjacent two of the plurality of data lines, where N is an positive integer.

5. The control circuit according to claim 1, wherein the first selected ones of the plurality of data lines where the switches in the second switch set are electrically connected are odd-numbered ones of the plurality of data lines.

6. The control circuit according to claim 1, further comprising a third switch set including a plurality of switches, which are electrically connected to the voltage output pin in parallel, and second selected ones of the plurality of data lines, respectively, wherein the second selected ones of data lines are different from the first selected ones of the data lines.

7. The control circuit according to claim 6, wherein the timing controller further outputs a third control signal to optionally switch on the switches in the third switch set in a third duration to discharge charges stored in the pixel units via the voltage output pin.

8. The control circuit according to claim 1, wherein the timing controller adjusts the second duration according to the averaged gray level of the image.

9. A control method of a control circuit for controlling a flat panel display, the flat panel display comprising a plurality of pixel units, the control circuit comprising a power supply unit, a data driver coupled to a plurality of data lines which are electrically connected to the pixel units, respectively; a first switch set including a plurality of switches electrically connected to two of the data lines; and a second switch set including a plurality of switches, which are electrically connected to a voltage output pin of the voltage supply unit in parallel, and electrically connected to first selected ones of data lines, respectively, the control method comprising the steps of:

outputting a first control signal to optionally switch on the switches in the first switch set in a first duration to re-allocate charges stored in the plurality of pixel units;

outputting a second control signal to optionally switch on the switches in the second switch set in a second duration to discharge charges stored in the plurality of pixel units via the voltage output pin; and switching off the plurality of switches in the second switch set if an averaged gray level of an image is higher than a threshold.

10. The control method according to claim 9, wherein the data driver is electrically connected to capacitors of the plurality of pixel units via the plurality of data lines, respectively, the power supply unit is a low dropout regulator, and when the number of the data lines is N, the number of the plurality of switches in the first switch set is (N−1), and each of the plurality of switches in the first switch set is electrically connected to adjacent two of the plurality of data lines, where N is a positive integer.

11. The control method according to claim 9, wherein the first selected ones of the plurality of data lines where the switches in the second switch set are odd-numbered ones of the plurality of data lines.

12. The control method according to claim 11, wherein a third switch set including a plurality of switches is further provided, which are electrically connected to the voltage output pin in parallel, and second selected ones of the plurality of data lines, respectively, where in the second selected ones of data lines are different from the first selected ones of the data lines.

13. The control method according to claim 12, further comprising a step of outputting a third control signal to optionally switch on the switches in the third switch set in a third duration to discharge charges stored in the plurality of pixel units via the voltage output pin.

14. The control method according to claim 13, wherein the third control signal is outputted to optionally switch on even-numbered ones of the switches in the third switch set in the third duration.

15. The control method according to claim 14, wherein the second control signal is outputted to optionally switch on odd-numbered ones of the switches in the second switch set in the second duration.

16. The control method according to claim 9, further comprising a step of adjusting the second duration according to the averaged gray level of the image.

17. A control circuit for use in a flat panel display, the flat panel display comprising a plurality of pixel units, and the control circuit comprising:

a power supply unit including a voltage output pin;

a data driver to be electrically coupled to a plurality of data lines which are electrically connected to the plurality of pixel units, respectively;

a first switch set including a plurality of switches, each of which is electrically connected to two of the plurality of data lines;

a second switch set including a plurality of switches, which are electrically connected to the voltage output pin in parallel, and electrically connected to first selected ones of the plurality of data lines, respectively; and a timing controller in communication with the power supply unit, the first switch set and the second switch set, for outputting a first control signal to optionally switch on the switches in the first switch set in a first duration to re-allocate charges stored in the plurality of pixel units, and simultaneously electrically disconnect the data driver and the plurality of data lines in a first duration, outputting a second control signal to optionally switch on the switches in the second switch set in a second duration to discharge charges stored in the plurality of pixel units via the voltage output pin, and simultaneously electrically connect the data driver and the plurality of data lines in the second duration, and wherein the timing controller switches off the switches in the second switch set if an averaged gray level of an image is higher than a threshold.

18. The control circuit according to claim 17, further comprising a third switch set including a plurality of switches, wherein the data driver is electrically coupled to the plurality of data lines respectively via the plurality of switches in the third switch set.

19. The control circuit according to claim 18, wherein the timing controller outputs the first control signal to control the switches in the third switch set via an inverter, and when the first control signal switches on the switches in the first switch set, the first control signal switches off the switches in the third switch set via the inverter.

* * * * *